(12) United States Patent
Chien et al.

(10) Patent No.: US 9,952,697 B2
(45) Date of Patent: Apr. 24, 2018

(54) TOUCH MODULE AND MANUFACTURING METHOD THEREOF

(71) Applicant: TPK Touch Solutions Inc., Taipei (TW)

(72) Inventors: Shun-Ta Chien, Taoyuan (TW); Chen-Yu Liu, Taoyuan (TW)

(73) Assignee: TPK Touch Solutions Inc., Taipei (TW)

( * ) Notice: Subject to any disclaimer, the term of this patent is extended or adjusted under 35 U.S.C. 154(b) by 263 days.

(21) Appl. No.: 14/636,105

(22) Filed: Mar. 2, 2015

(65) Prior Publication Data
US 2015/0253916 A1    Sep. 10, 2015

(30) Foreign Application Priority Data

Mar. 5, 2014  (CN) .......................... 2014 1 0078605

(51) Int. Cl.
*G06F 3/044* (2006.01)
*G06F 3/041* (2006.01)

(52) U.S. Cl.
CPC ........... *G06F 3/0412* (2013.01); *G06F 3/044* (2013.01); *G06F 2203/04103* (2013.01); *Y10T 29/49126* (2015.01); *Y10T 29/49155* (2015.01)

(58) Field of Classification Search
CPC ................... G06F 3/044; G06F 3/0412; G06F 2203/04103
See application file for complete search history.

(56) References Cited

U.S. PATENT DOCUMENTS

| | | | | |
|---|---|---|---|---|
| 8,884,918 B2* | 11/2014 | Cok | ......................... | G06F 3/044 345/173 |
| 2006/0038791 A1* | 2/2006 | Mackey | .................. | G06F 3/044 345/173 |
| 2010/0238133 A1* | 9/2010 | Wu | .......................... | G06F 3/044 345/174 |
| 2012/0019473 A1* | 1/2012 | Edwards | .................. | G06F 3/044 345/174 |
| 2012/0064513 A1* | 3/2012 | Yoo | ................... | G01N 33/54373 435/5 |

* cited by examiner

*Primary Examiner* — Kent Chang
*Assistant Examiner* — Scott Au
(74) *Attorney, Agent, or Firm* — Paul David Bendermire

(57) ABSTRACT

A touch module and a manufacturing method thereof are disclosed. The touch module includes a substrate, at least one first touch electrode, and at least one second touch electrode. The first touch electrode is embedded into the substrate. The second touch electrode is embedded into the substrate. A height of the first touch electrode relative to a first surface of the substrate is different from a height of the second touch electrode relative to the first surface of the substrate, such that the first touch electrode and the second touch electrode are insulated from each other.

19 Claims, 13 Drawing Sheets

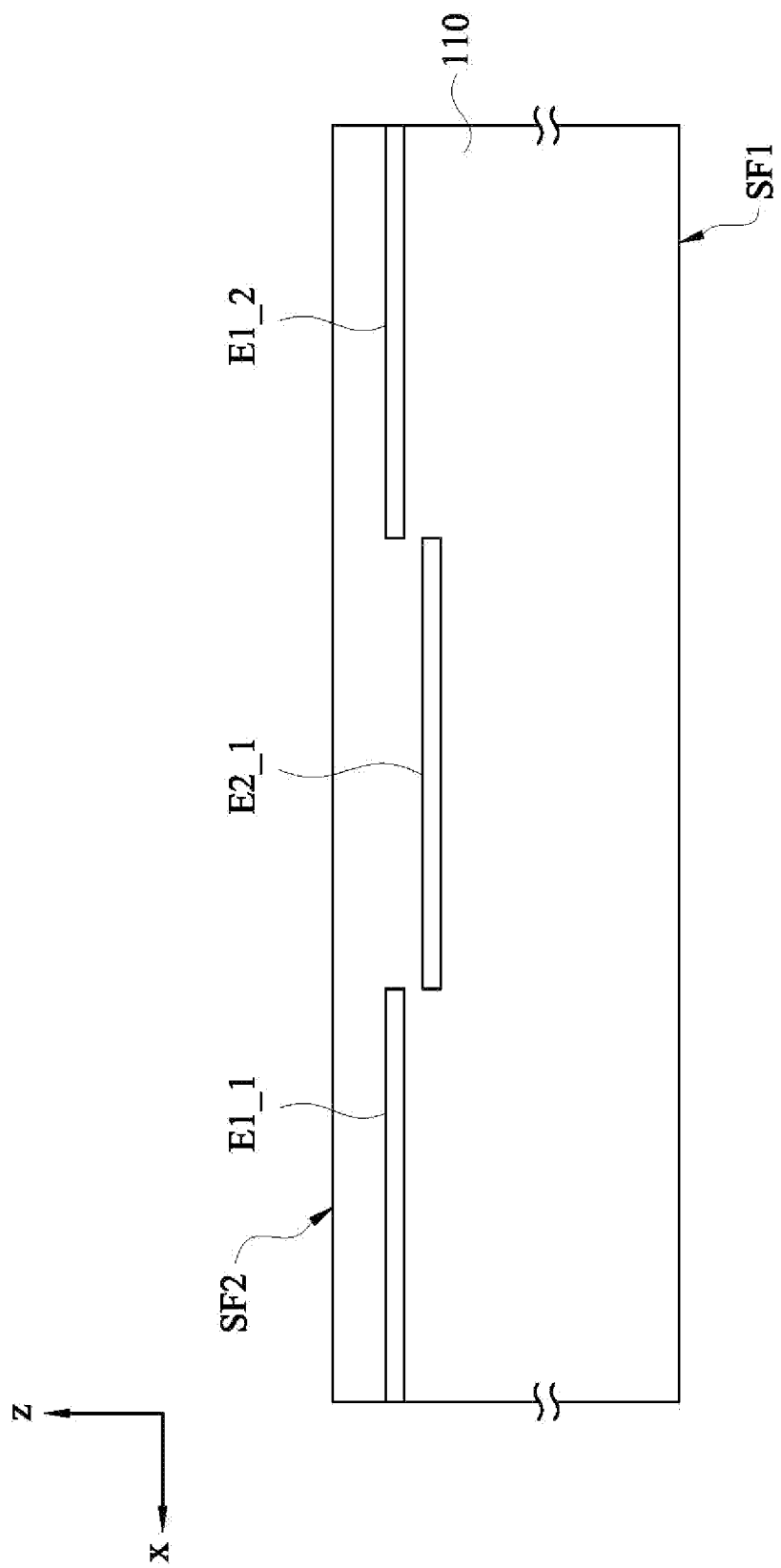

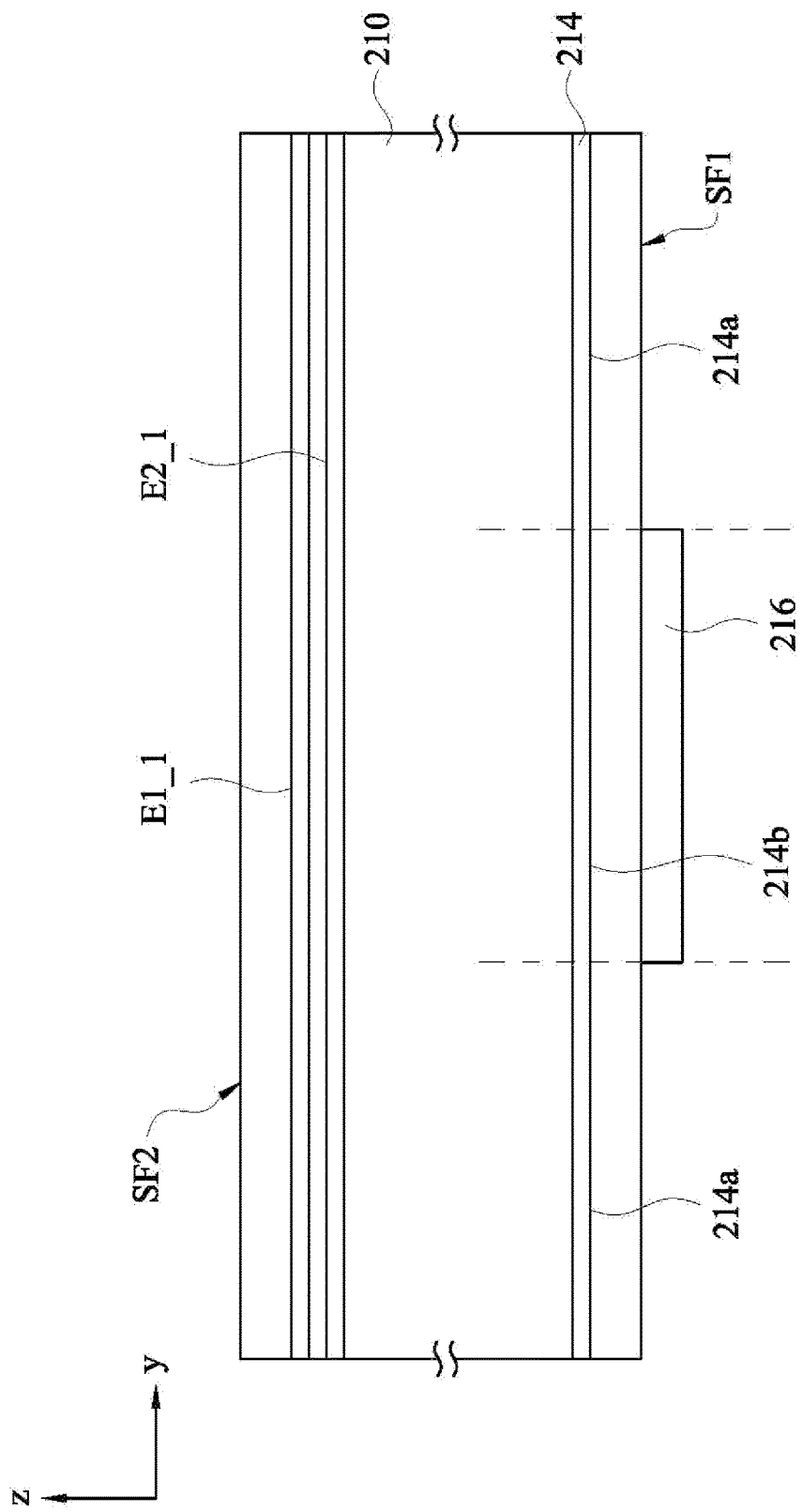

TOUCH MODULE AND MANUFACTURING METHOD THEREOF

BACKGROUND OF THE INVENTION

This application claims priority to China Application Serial Number 201410078605.2, filed Mar. 5, 2014, which is herein incorporated by reference.

Field of Invention

The present disclosure relates to an electronic device and a manufacturing method. More particularly, the present disclosure relates to a touch module and a manufacturing method thereof.

Description of Related Art

With advances in electronic technology, touch modules are widely used in various kinds of electronic devices, such as mobile phones and tablet computers.

A typical touch module can be, for example, disposed on a display screen, and include a plurality of touch electrodes. When an object (e.g., a finger or a stylus pen) approaches or touches the display screen, a corresponding touch electrode generates an electronic signal and transmits the electronic signal to a control circuit, such that touch sensing can be realized.

In a manufacturing process of the touch module, conductive material disposed between the touch electrodes is typically removed by an etching process, so as to pattern the touch electrodes and isolate the touch electrodes from each other.

SUMMARY OF THE INVENTION

Thus, in order to avoid uneven refractive indexes of a touch module, one aspect of the present disclosure is related to a touch module. In accordance with one or more embodiments of the present disclosure, the touch module includes a first substrate, at least one first touch electrode, and at least one second touch electrode. The first touch electrode is embedded in the first substrate. The second touch electrode is embedded in the first substrate. The height of the first touch electrode relative to a first surface of the substrate is sufficiently different from a height of the second touch electrode relative to the first surface of the substrate, such that the first touch electrode and the second touch electrode are insulated from each other.

In accordance with one or more embodiments of the present disclosure, a difference between the height of the first touch electrode relative to the first surface of the first substrate and the height of the second touch electrode relative to the first surface of the first substrate is substantially greater than 50 nanometers.

In accordance with one or more embodiments of the present disclosure, orthogonal projections of the first touch electrode and the second touch electrode onto the first surface of the first substrate are substantially not overlapped with each other.

In accordance with one or more embodiments of the present disclosure, the first touch electrode and the second touch electrode are formed as strips.

In accordance with one or more embodiments of the present disclosure, the first touch electrode and the second touch electrode are parallel to each other.

In accordance with one or more embodiments of the present disclosure, at least one of the first touch electrode and the second touch electrode is completely embedded inside the first substrate.

In accordance with one or more embodiments of the present disclosure, the touch module further includes at least one third touch electrode embedded in the first substrate, and at least one fourth touch electrode embedded in the first substrate. Heights of the first, second, third, and fourth touch electrodes, relative to the first surface of the substrate are sufficiently different from each other, such that the first, second, third, and fourth touch electrodes are insulated from each other.

In accordance with one or more embodiments of the present disclosure, a difference between heights of any two of the first, second, third and fourth touch electrodes relative to the first surface of the first substrate is substantially greater than 50 nanometers.

In accordance with one or more embodiments of the present disclosure, the third touch electrode and the fourth touch electrode are parallel to each other, and the third and fourth touch electrodes are perpendicular to the first and second touch electrodes.

In accordance with one or more embodiments of the present disclosure, an embedding depth of the third touch electrode relative to the first surface of the first substrate is substantially between 10 and 500 nanometers.

In accordance with one or more embodiments of the present disclosure, orthogonal projections of the third touch electrode and the fourth touch electrode onto the first surface of the first substrate are substantially not overlapped with each other.

In accordance with one or more embodiments of the present disclosure, the third touch electrode and the fourth touch electrode are formed as strips.

In accordance with one or more embodiments of the present disclosure, at least one of the third touch electrode and the fourth touch electrode is completely embedded inside the first substrate.

In accordance with one or more embodiments of the present disclosure, one of the first touch electrode and the second touch electrode is floated, and one of the third touch electrode and the fourth touch electrode is floated.

In accordance with one or more embodiments of the present disclosure, the touch module further includes a second substrate, at least one third touch electrode embedded in the second substrate, and at least one fourth touch electrode embedded in the second substrate. Heights of the third and fourth touch electrodes relative to a third surface of the substrate are sufficiently different from each other, such that the third and fourth touch electrodes are insulated from each other.

In accordance with one or more embodiments of the present disclosure, the first substrate and the second substrate are stacked orthogonally, such that orthogonal projections of the first and second touch electrodes onto a predetermined plane is perpendicular to orthogonal projections of the third and fourth touch electrodes onto the predetermined plane.

Another aspect of the present disclosure is related to a manufacturing method of a touch module. In accordance with one or more embodiments of the present disclosure, the manufacturing method includes embedding a first conducting material layer into a first substrate, wherein the first conducting material layer comprises at least one first electrode portion and at least one second electrode portion, and embedding the second electrode portion into the first substrate relative to the first electrode portion, so as to separate the first electrode portion and the second electrode portion and separately form a first touch electrode and a second touch electrode, wherein the first touch electrode and the second touch electrode are insulated from each other.

In accordance with one or more embodiments of the present disclosure, the step of embedding the first conducting material layer into the first substrate includes providing an embedding ink with a first conducting additive on the first surface of the first substrate, so as to make the first conducting additive be embedded into the first substrate to form the first conducting material layer.

In accordance with one or more embodiments of the present disclosure, the step of embedding the second electrode portion into the first substrate relative to the first electrode portion includes providing an embedding ink without conducting additive on the first surface of the first substrate corresponding in location to the second electrode portion of the first conducting material layer, so as to embed the second electrode portion into the first substrate relative to the first electrode portion.

In accordance with one or more embodiments of the present disclosure, the manufacturing method further includes embedding a second conducting material layer into the first substrate, wherein the second conducting material layer comprises at least one third electrode portion and at least one fourth electrode portion, and embedding the third electrode portion into the first substrate relative to the third electrode portion, so as to separate the third electrode portion and the fourth electrode portion and separately form a third touch electrode and a fourth touch electrode, wherein the first touch electrode, the second touch electrode, the third touch electrode, and the fourth touch electrode are insulated from each other.

In accordance with one or more embodiments of the present disclosure, the step of embedding the second conducting material layer into the first substrate includes providing an embedding ink with a second conducting additive on a second surface of the first substrate, so as to make the second conducting additive be embedded into the first substrate to form the second conducting material layer.

In accordance with one or more embodiments of the present disclosure, the step of embedding the fourth electrode portion into the first substrate relative to the third electrode portion includes providing an embedding ink without conducting additive on the second surface of the first substrate corresponding in location to the fourth electrode portion of the second conducting material layer, so as to embed the fourth electrode portion into the first substrate relative to the third electrode portion.

In accordance with one or more embodiments of the present disclosure, the manufacturing method further includes embedding a second conducting material layer into a second substrate, wherein the second conducting material layer comprises at least one third electrode portion and at least one fourth electrode portion, and embedding the fourth electrode portion into the first substrate relative to the third electrode portion, so as to separate the third electrode portion and the fourth electrode portion and separately form a third touch electrode and a fourth touch electrode, wherein the first touch electrode, the second touch electrode, the third touch electrode, and the fourth touch electrode are insulated from each other.

In view of the above, through application of one or more embodiments described above, a touch module can be realized. By differentiating the heights of the touch electrodes embedded in the first substrate, the touch electrodes can be isolated from each other. Through such an operation, patterning the touch electrodes by an etching process can be avoided, such that the problem of adversely affecting the optical consistency in the appearance of the touch module caused by uneven refractive indexes of the touch module is not encountered.

BRIEF DESCRIPTION OF THE DRAWINGS

FIGS. 5A-5C illustrate a manufacturing method of a touch module according to one or more embodiments of the present disclosure.

FIGS. 6A-6C illustrate a manufacturing method of a touch module according to one or more embodiments of the present disclosure.

DETAILED DESCRIPTION OF THE INVENTION

Figure 1A:
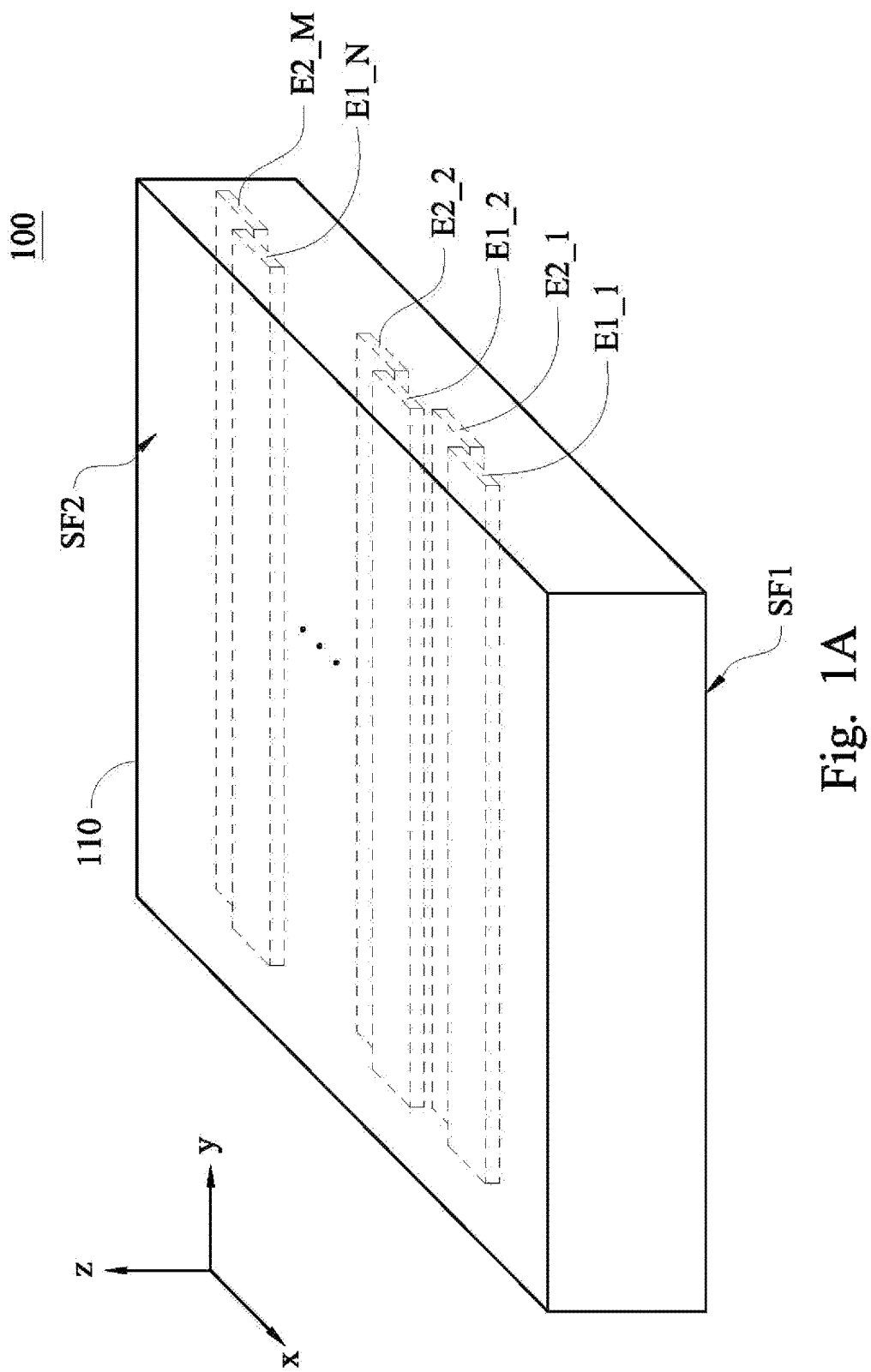
FIG. 1A illustrates a touch module according to one or more embodiments of the present disclosure.

Reference will now be made in detail to the present embodiments of the present disclosure, examples of which are illustrated in the accompanying drawings. Wherever possible, the same reference numbers are used in the drawings and the description to refer to the same or like parts.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, unless otherwise defined, all terms (including technical and scientific terms) have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. §112(f). In particular, the use of "step of" in the claims herein is not intended to invoke the provisions of 35 U.S.C. §112(f).

Figure 1B:
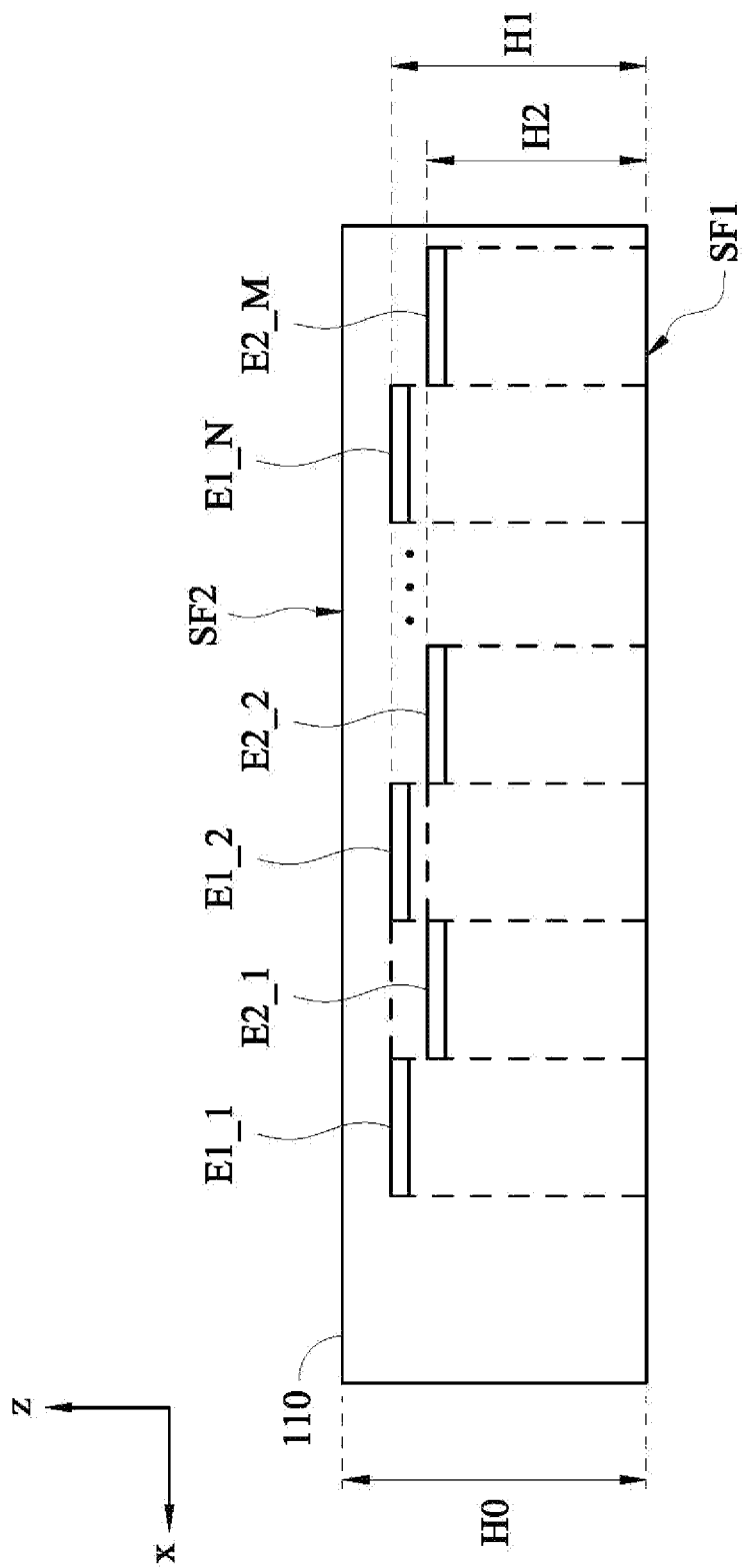
FIG. 1B is a lateral view of the touch module illustrated in FIG. 1A.
Figure 1C:
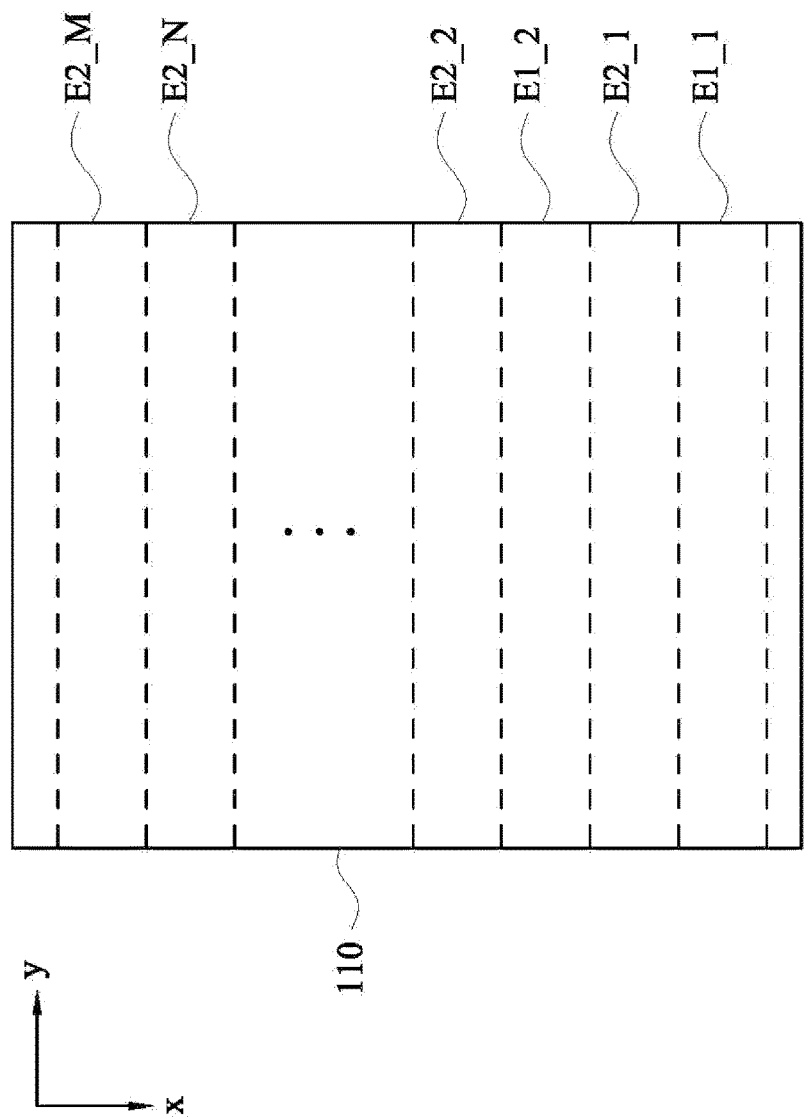
FIG. 1C is a top view of the touch module illustrated in FIG. 1A.

Reference is made to FIGS. 1A, 1B, and 1C, in which FIG. 1A illustrates a touch module 100 according to one or more embodiments of the present disclosure, FIG. 1B is a lateral view of the touch module 100 illustrated in FIG. 1A, and FIG. 1C is a top view of the touch module 100 illustrated in FIG. 1A.

In some embodiments, the touch module 100 includes a plurality of first touch electrodes E1_1, E1_2, . . . , E1_N and a plurality of second touch electrodes E2_1, E2_2, . . . , E2_M, in which N and M are integers. In some embodiments, the first touch electrodes E1_1, E1_2, . . . , E1_N and the second touch electrodes E2_1, E2_2, . . . , E2_M are formed substantially as strips. The first touch electrodes E1_1, E1_2, . . . , E1_N and the second touch electrodes E2_1, E2_2, . . . , E2_M are substantially parallel to each other. The first touch electrodes E1_1, E1_2, . . . , E1_N and the second touch electrodes E2_1, E2_2, . . . , E2_M are parallel to a first surface SF1 of a substrate 110. In some embodiments, the first touch electrodes E1_1, E1_2, . . . , E1_N and the second touch electrodes E2_1, E2_2, . . . , E2_M are interleaved with each other in a compact configuration.

For example, if an x-y-z rectangular coordinate system as shown in the drawings is used for reference, long sides of the first touch electrodes E1_1, E1_2, . . . , E1_N and the second touch electrodes E2_1, E2_2, . . . , E2_M are parallel to the y-axis. The first touch electrodes E1_1, E1_2, . . . , E1_N and the second touch electrodes E2_1, E2_2, . . . , E2_M are interleaved in sequence along a −x direction. That is, the second touch electrode E2_1 is disposed adjacent to a −x direction side of the first touch electrode E1_1, the first touch electrode E1_2 is disposed adjacent to a −x direction side of the second touch electrode E2_1, the second touch electrode E2_2 is disposed adjacent to a −x direction side of the first touch electrode E1_2, and so on.

In some embodiments, the first touch electrodes E1_1, E1_2, . . . , E1_N and the second touch electrodes E2_1, E2_2, . . . , E2_M are separately embedded in the substrate 110. One of the first touch electrodes E1_1, E1_2, . . . , E1_N has a height relative to the first surface SF1 of the substrate 110 sufficiently different from a height of an adjacent one of the second touch electrodes E2_1, E2_2, . . . , E2_M relative to the first surface SF1 of the substrate 110, such that the one of the first touch electrodes E1_1, E1_2, . . . , E1_N and the adjacent one of the second touch electrodes E2_1, E2_2, . . . , E2_M are insulated from each other. In other words, the first touch electrodes E1_1, E1_2, . . . , E1_N and the second touch electrodes E2_1, E2_2, . . . , E2_M separately form a plurality of discontinuous planes (i.e., the planes do not contact each other), such that these electrodes are electrically insulated from each other.

Taking the first touch electrode E1_1 as an example, the height of the first touch electrode E1_1 relative to the first surface SF1 of the substrate 110 is different from the height of the adjacent second touch electrode E2_1 relative to the first surface SF1 of the substrate 110, such that the first touch electrode E1lis electrically insulated from the adjacent second touch electrode E2_1.

Referring to FIG. 1B, the height of the first touch electrode E1_1 relative to the first surface SF1 of the substrate 110 is labeled as H1. The height of the second touch electrode E2_1 relative to the first surface SF1 of the substrate 110 is labeled as H2. The heights H1 and H2 are sufficiently different from each other, such that the first touch electrode E1_1 and the second touch electrode E2_1 do not make contact and are insulated from each other.

In such a configuration, the touch electrodes E1_1, E1_2, . . . , E1_N, E2_1, E2_2, . . . , E2_M can be insulated from each other without using an etching process, which avoids adversely affecting optical consistency in the appearance of the touch module 100 caused by uneven refractive indexes of the touch module.

In one or more embodiments, a difference between the heights H1, H2 (i.e., H2−H1) is substantially greater than 50 nanometers, such that the first touch electrode E1_1 and the second touch electrode E2_1 can be electrically insulated from each other.

In one or more embodiments, the first touch electrodes E1_1, E1_2, . . . , E1_N and the second touch electrodes E2_1, E2_2, . . . , E2_M are completely embedded inside the substrate 100. That is, the first touch electrodes E1_1, E1_2, . . . , E1_N and the second touch electrodes E2_1, E2_2, . . . , E2_M are not exposed on the first surface SF1 or a second surface SF2 (a surface opposite the first surface SF1) of the substrate 110. As a result, it is not necessary for the touch module 100 to have an additional passive layer thereon to protect or isolate the first touch electrodes E1_1, E1_2, . . . , E1_N and/or the second touch electrodes E2_1, E2_2, . . . , E2_M, as would be necessary were these elements exposed on the surfaces SF1, SF2 of the substrate 110. As a result, time and cost associated with manufacturing of the touch module 100 can be decreased.

In one or more embodiments, in order to avoid exposing any one of the first touch electrodes E1_1, E1_2, . . . , E1_N on the first surface SF1 or the second surface SF2 of the substrate 110, the embedding depth of any one of the first touch electrodes E1_1, E1_2, . . . , E1_N is substantially between 10 and 500 nanometers relative to the second surface SF2 of the substrate 110. For example, the embedding depth of the first touch electrode E1_1 relative to the second surface SF2 of the substrate 110 (e.g., H0−H1, in which height H0 is a height between the second surface SF2 and first surface SF1 of the substrate 110) is substantially between 10 and 500 nanometers.

It should be noted that, in the figures of the present disclosure, all of the first touch electrodes E1_1, E1_2, . . . , E1_N are illustrated as having identical heights, and all of the second touch electrodes E2_1, E2_2, . . . , E2_M are illustrated as having identical heights. However, the heights of the first touch electrodes E1_1, E1_2, . . . , E1_N and the heights of the second touch electrodes E2_1, E2_2, . . . , E2_M can be varied on the basis of actual requirements, and are not limited to the embodiments in the figures.

Referring to FIG. 1C, in some embodiments, since the first touch electrodes E1_1, E1_2, . . . , E1_N and the second touch electrodes E2_1, E2_2, . . . , E2_M are patterned by differentiating the heights of the first touch electrodes E1_1, E1_2, . . . , E1_N and the second touch electrodes E2_1, E2_2, . . . , E2_M, substantially no gaps are present among the orthogonal projections of the touch electrodes E1_1, E1_2, . . . , E1_N, E2_1, E2_2, . . . , E2_M onto the x-y plane (i.e., in the top view). That is, substantially no gaps are present among the orthogonal projections of the first touch electrodes E1_1, E1_2, . . . , E1_N and the second touch electrodes E2_1, E2_2, . . . , E2_M onto the first surface SF1 of the substrate 110. Stated in yet another way, the orthogonal projections of the first touch electrodes E1_1, E1_2, . . . , E1_N and the second touch electrodes E2_1, E2_2, . . . , E2_M onto the first surface SF1 of the substrate 110 form a continuous and intact plane.

Such a configuration prevents adversely affecting optical consistency in the appearance of the touch module 100 caused by gaps among the first touch electrodes E1_1, E1_2, . . . , E1_N and the second touch electrodes E2_1, E2_2, . . . , E2_M.

It should be noted that the orthogonal projections of the first touch electrodes E1_1, E1_2, . . . , E1_N and the second touch electrodes E2_1, E2_2, . . . , E2_M onto the first surface SF1 of the substrate 110 are substantially not overlapped with each other (as illustrated in FIG. 1B), for example, the left edge of E1_2 does not overlap the right edge of E2_1, such that the capacitive coupling effect among the first touch electrodes E1_1, E1_2, . . . , E1_N and the second touch electrodes E2_1, E2_2, . . . , E2_M can be minimized.

Figure 2A:
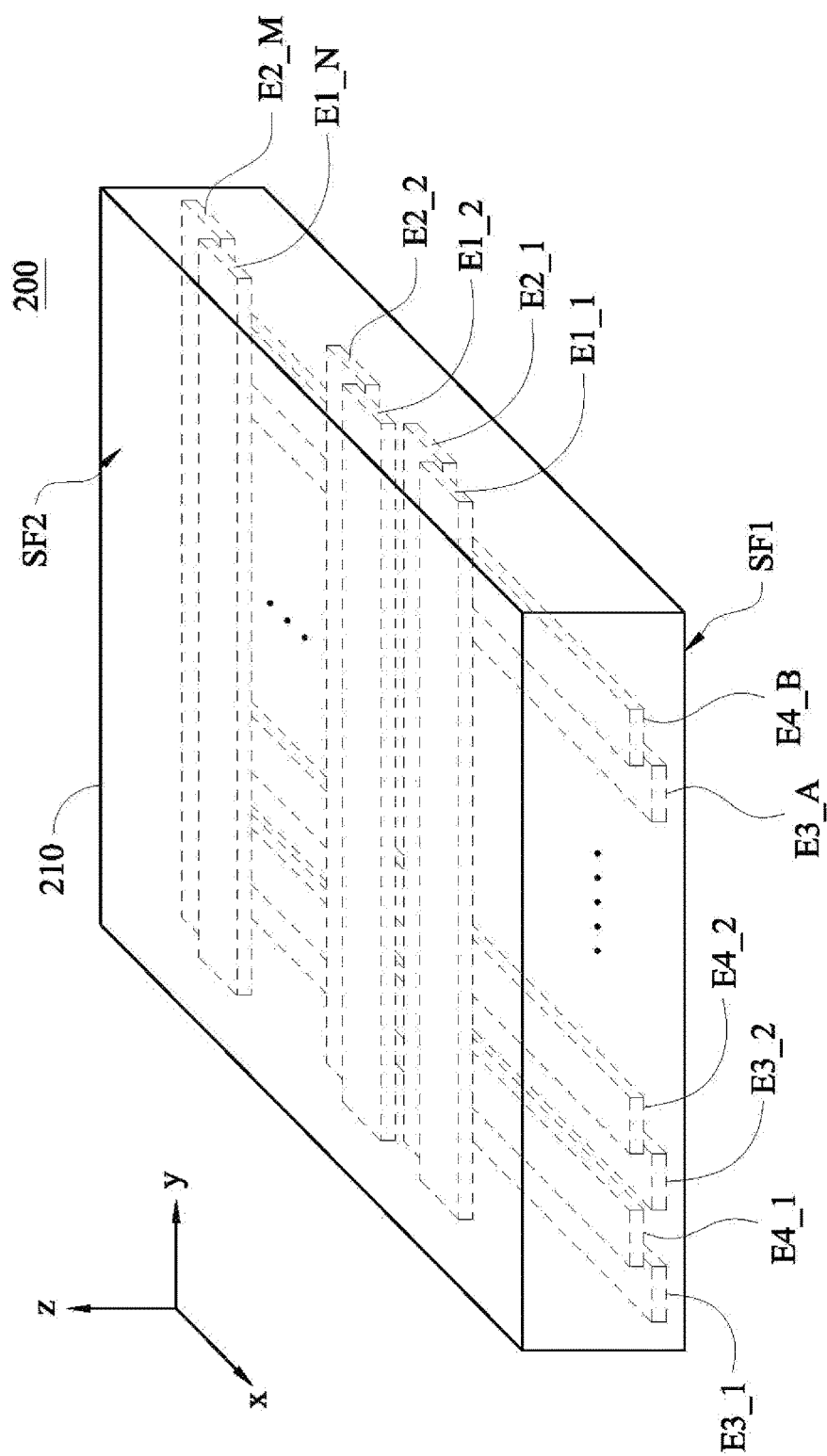
FIG. 2A illustrates a touch module according to some other embodiments of the present disclosure.

FIG. 2A illustrates a touch module 200 according to some other embodiments of the present disclosure.

In some embodiments, the touch module 200 includes a plurality of first touch electrodes E1_1, E1_2, . . . , E1_N, a plurality of second touch electrodes E2_1, E2_2, . . . , E2_M, a plurality of third touch electrodes E3_1, E3_2, . . . , E2_A, and a plurality of fourth touch electrodes E4_1, E4_2, . . . , E4_B, in which N, M, A, and B are integers. In some embodiments, details of the first touch electrodes E1_1, E1_2, . . . , E1_N and the second touch electrodes E2_1, E2_2, . . . , E2_M of the touch panel 200 are substantially identical to the first touch electrodes E1_1, E1_2, . . . , E1_N and the second touch electrodes E2_1, E2_2, . . . , E2_M of the touch panel 100 in the embodiment illustrated in FIGS. 1A-1C, and many aspects that are similar will not be repeated herein.

In some embodiments, the third touch electrodes E3_1, E3_2, . . . , E3_A and the fourth touch electrodes E4_1, E4_2, . . . , E4_B are formed substantially as strips. The third touch electrodes E3_1, E3_2, . . . , E3_A and the fourth touch electrodes E4_1, E4_2, . . . , E4_B are substantially parallel to each other. The third touch electrodes E3_1, E3_2, . . . , E3_A and the fourth touch electrodes E4_1, E4_2, . . . , E4_B are parallel to a first surface SF1 of a substrate 210. The third touch electrodes E3_1, E3_2, . . . , E3_A and the fourth touch electrodes E4_1, E4_2, . . . , E4_B are perpendicular to the first touch electrodes E1_1, E1_2, . . . , E1_N and the second touch electrodes E2_1, E2_2, . . . , E2_M. The third touch electrodes E3_1, E3_2, . . . , E3_A and the fourth touch electrodes E4_1, E4_2, . . . , E4_B are interleaved with each other in a compact configuration.

For example, if an x-y-z rectangular coordinate system as shown in the drawing is used for reference, long sides of the third touch electrodes E3_1, E3_2, . . . , E3_A and the fourth touch electrodes E4_1, E4_2, . . . , E4_B are parallel to the x-axis. The third touch electrodes E3_1, E3_2, . . . , E3_A and the fourth touch electrodes E4_1, E4_2, . . . , E4_B are interleaved in sequence along a +y direction. That is, the fourth touch electrode E4_1 is disposed adjacent to a +y direction side of the third touch electrode E3_1, the third touch electrode E3_2 is disposed adjacent to a +y direction side of the fourth touch electrode E4_1, the fourth touch electrode E4_2 is disposed adjacent to a +y direction side of the third touch electrode E3_2, and so on.

In some embodiments, the third touch electrodes E3_1, E3_2, . . . , E3_A and the fourth touch electrodes E4_1, E4_2, . . . , E4_B are separately embedded in the substrate 210.

One of the third touch electrodes E3_1, E3_2, . . . , E3_A has a height relative to the first surface SF1 of the substrate 210 sufficiently different from a height of an adjacent one of the fourth touch electrodes E4_1, E4_2, . . . , E4_B relative to the first surface SF1 of the substrate 210, such that the one of the third touch electrodes E3_1, E3_2, . . . , E3_A and the adjacent one of the fourth touch electrodes E4_1, E4_2, . . . , E4_B are insulated from each other. In other words, the third touch electrodes E3_1, E3_2, . . . , E3_A and the fourth touch electrodes E4_1, E4_2, . . . , E4_B separately form a plurality of discontinuous planes (i.e., the planes do not contact each other), such that these electrodes are electrically insulated from each other.

Taking the third touch electrode E3_1 as an example, the height of the third touch electrode E3_1 relative to the first surface SF1 of the substrate 210 is different from the height of the adjacent fourth touch electrode E4_1 relative to the first surface SF1 of the substrate 210, such that the third touch electrode E3_1 is electrically insulated from the adjacent fourth touch electrode E4_1.

Figure 2B:
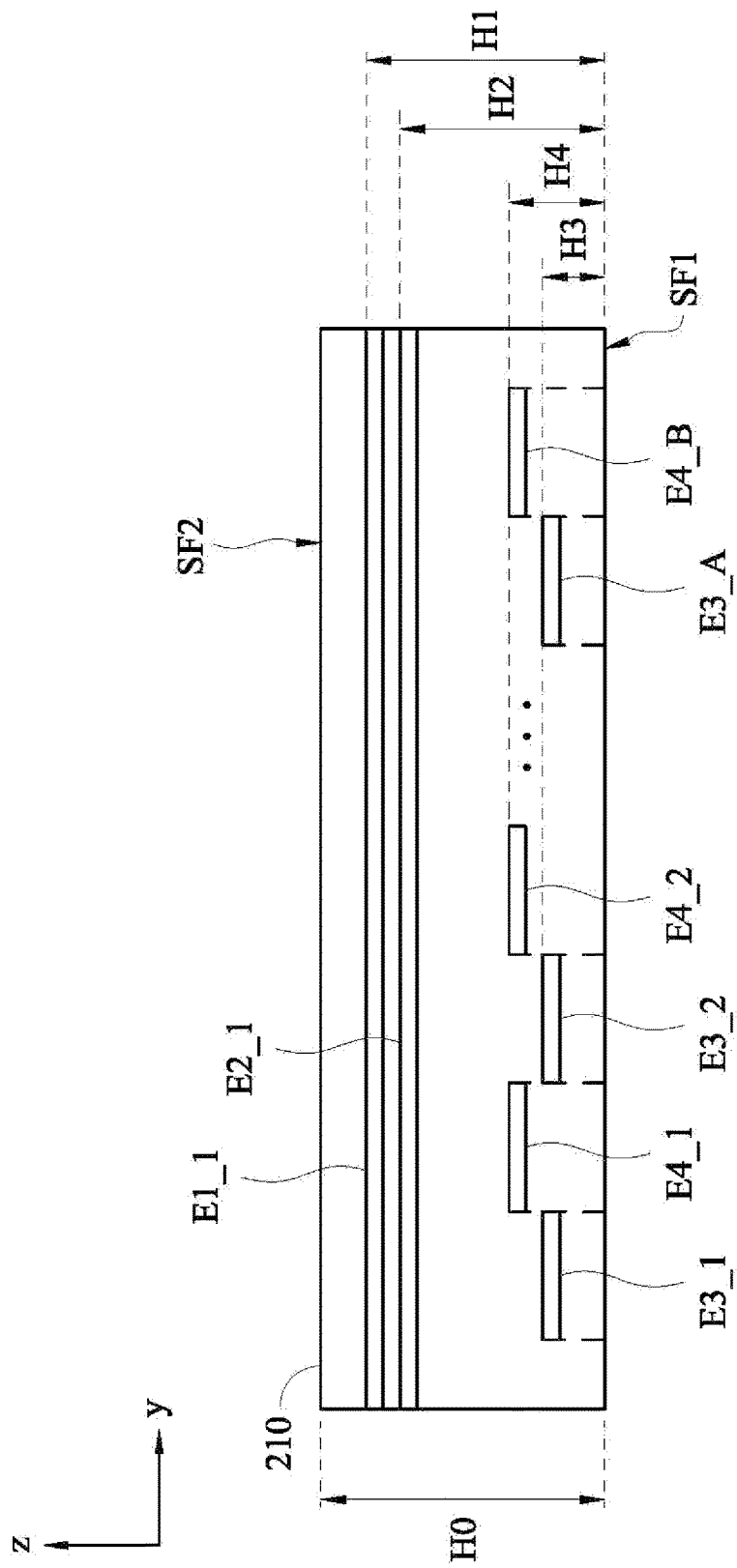
FIG. 2B is a lateral view of the touch module illustrated in FIG. 2A.

Referring to FIG. 2B, which is a lateral view of the touch module 200 illustrated in FIG. 2A on a y-z plane, the height of the first touch electrode E1_1 relative to the first surface SF1 of the substrate 210 is labeled as H1. The height of the second touch electrode E2_1 relative to the first surface SF1 of the substrate 110 is labeled as H2. The height of the third touch electrode E3_1 relative to the first surface SF1 of the substrate 210 is labeled as H3. The height of the fourth touch electrode E4_1 relative to the first surface SF1 of the substrate 210 is labeled as H4. The heights H1, H2, H3, and H4 are sufficiently different from each other, such that the first touch electrode E1_1, the second touch electrode E2_1, the third touch electrode E3_1, and the fourth touch electrode E4_1 do not make contact and are insulated from each other.

In one or more embodiments, a difference between the heights H3, H4 (i.e., H4–H3) is substantially greater than 50 nanometers, such that the third touch electrode E3_1 and the fourth touch electrode E4_1 can be electrically insulated from each other. A difference between the heights H2, H4 (i.e., H2–H4) is substantially greater than 50 nanometers, such that the second touch electrode E2_1 and the fourth touch electrode E4_1 can be electrically insulated from each other.

In one or more embodiments, the third touch electrodes E3_1, E3_2, . . . , E3_A and the fourth touch electrodes E4_1, E4_2, . . . , E4_B are completely embedded inside the substrate 200. That is, the third touch electrodes E3_1, E3_2, . . . , E3_A and the fourth touch electrodes E4_1, E4_2, . . . , E4_B are not exposed on the first surface SF1 or a second surface SF2 (a surface opposite the first surface SF1) of the substrate 210. As a result, it is not necessary for the touch module 200 to have an additional passive layer thereon to protect or isolate the third touch electrodes E3_1, E3_2, . . . , E3_A and the fourth touch electrodes E4_1, E4_2, . . . , E4_B, as would be necessary were these elements exposed on the surfaces SF1, SF2 of the substrate 210. As a result, the time and costs associated with manufacturing the touch module 200 can be decreased.

In one or more embodiments, in order to avoid exposing any one of the third touch electrodes E3_1, E3_2, . . . , E3_A on the first surface SF1 or the surface SF2 of the substrate 210, the embedding depth of any one of the third touch electrodes E3_1, E3_2, . . . , E3_A is substantially between 10 and 500 nanometers relative to the second surface SF2 of the substrate 210.

It should be noted that, in the figures of the present disclosure, all of the third touch electrodes E3_1, E3_2, . . . , E3_A are illustrated as having identical heights, and all of the fourth touch electrodes E4_1, E4_2, . . . , E4_B are illustrated as having identical heights. However, the heights of the third touch electrodes E3_1, E3_2, . . . , E3_A and the heights of the fourth touch electrodes E4_1, E4_2, . . . , E4_B can be varied on the basis of actual requirements, and are not limited to the embodiments in the figures.

In one or more embodiments, substantially no gaps are present among the orthogonal projections of the third touch electrodes E3_1, E3_2, . . . , E3_A and the fourth touch electrodes E4_1, E4_2, . . . , E4_B onto the first surface SF1 of the substrate 210. In other words, the orthogonal projections of the third touch electrodes E3_1, E3_2, . . . , E3_A and the fourth touch electrodes E4_1, E4_2, . . . , E4_B onto the first surface SF1 of the substrate 210 can form a continuous and intact plane.

In one or more embodiments, the top view of the touch module 200 illustrated in FIG. 2A on the x-y plane is similar to the embodiment illustrated in FIG. 1C, and therefore details of the touch module 200 can be ascertained by referring to the embodiment illustrated in FIG. 1C.

Through the configuration described above, the touch module 200 used to detect a touch point in two perpendicular directions (e.g., a horizontal direction and a perpendicular direction) can be realized.

It should be noted that, in an application of the present disclosure, the first touch electrodes E1_1, E1_2, . . . , E1_N or the second touch electrodes E2_1, E2_2, . . . , E2_M may be floated, and the third touch electrodes E3_1, E3_2, . . . , E3_A or the fourth touch electrodes E4_1, E4_2, . . . , E4_B may be floated. The term "floated" used herein indicates that the electrodes are electrically disconnected from or do not provide any touch sensing signal to the touch control circuit (not shown). For example, in this application, only the first touch electrodes E1_1, E1_2, . . . , E1_N or the second touch electrodes E2_1, E2_2, . . . , E2_M and the third touch electrodes E3_1, E3_2, . . . , E3_A or the fourth touch electrodes E4_1, E4_2, . . . , E4_B are used to detect a touch. In another application, all of the first touch electrodes E1_1, E1_2, . . . , E1_N, the second touch electrodes E2_1, E2_2, . . . , E2_M, the third touch electrodes E3_1, E3_2, . . . , E3_A, and the fourth touch electrodes E4_1, E4_2, . . . , E4_B are not floated (i.e., all of these electrodes are used to detect a touch).

It should be noted that, in the embodiment described above, the touch module 200 used to detect a touch point in two perpendicular directions is formed by embedding the first touch electrodes E1_1, E1_2, . . . , E1_N, the second touch electrodes E2_1, E2_2, . . . , E2_M, the third touch electrodes E3_1, E3_2, . . . , E3_A, and the fourth touch electrodes E4_1, E4_2, . . . , E4_B into the single substrate 210. However, in some embodiments, another touch module used to detect a touch point in two perpendicular directions may be formed by separately forming a touch module (e.g., a touch module 100) used to detect a touch point in a direction (e.g., a horizontal direction) and a touch module used to detect a touch point in another direction (e.g., a perpendicular direction) and subsequently stacking the two touch modules orthogonally.

Figure 3:
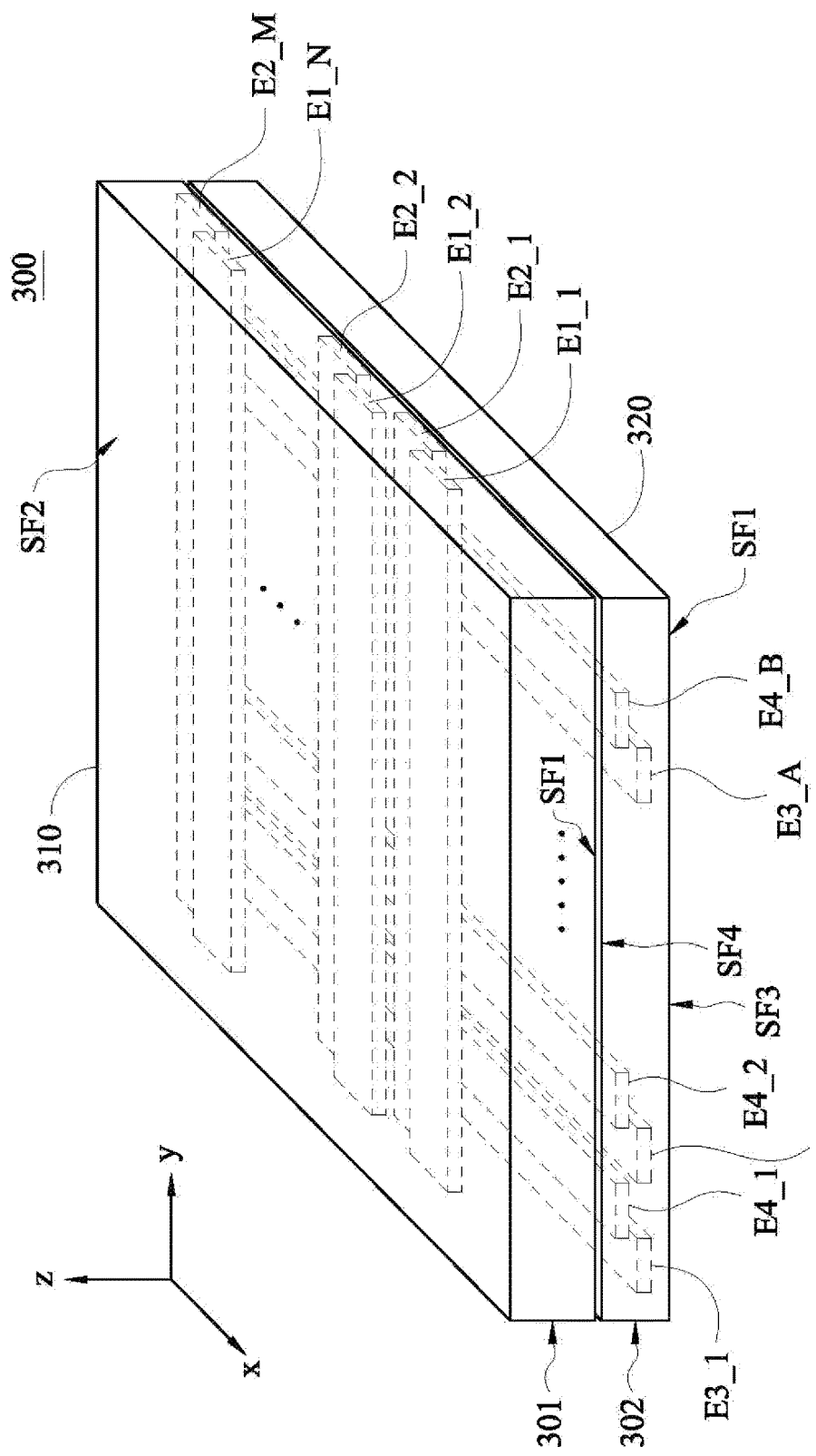
FIG. 3 illustrates a touch module according to some other embodiments of the present disclosure.

For example, referring to FIG. 3, in which FIG. 3 illustrates a touch module 300 according to some other embodiments of the present disclosure. In some embodiments, the touch module 300 includes touch sub-modules 301, 302. Each of the touch sub-modules 301, 302 has a structure substantially identical to the touch module 100 shown in FIG. 1. Thus, many aspects that are similar will not be repeated herein.

In some embodiments, the touch sub-module 301 includes a substrate 310, first touch electrodes E1_1, E1_2, . . . , E1_N and second touch electrodes E2_1, E2_2, . . . , E2_M. The substrate 310 has a first surface SF1 and a second surface SF2 opposite to the first surface SF1. The first touch electrodes E1_1, E1_2, . . . , E1_N and the second touch electrodes E2_1, E2_2, . . . , E2_M are embedded in the substrate 310. The heights of the first touch electrodes E1_1, E1_2, . . . , E1_N relative to the first surface SF1 of the substrate 310 are sufficiently different from the heights of the second touch electrodes E2_1, E2_2, . . . , E2_M relative to the first surface SF1 of the substrate 310, such that the first touch electrodes E1_1, E1_2, . . . , E1_N and the second touch electrodes E2_1, E2_2, . . . , E2_M are electrically insulated from each other.

The touch sub-module 302 includes a substrate 320, third touch electrodes E3_1, E3_2, . . . , E3_A and fourth touch electrodes E4_1, E4_2, . . . , E4_B. The substrate 320 has a third surface SF3 and a fourth surface SF4 opposite to the third surface SF3. The third touch electrodes E3_1, E3_2, . . . , E3_A and the fourth touch electrodes E4_1, E4_2, . . . , E4_B are embedded in the substrate 320. The heights of the third touch electrodes E3_1, E3_2, . . . , E3_A relative to the third surface SF3 of the substrate 320 are sufficiently different from the heights of the fourth touch electrodes E4_1, E4_2, . . . , E4_B relative to the third surface SF3 of the substrate 320, such that the third touch electrodes E3_1, E3_2, . . . , E3_A and the fourth touch electrodes E4_1, E4_2, . . . , E4_B are electrically insulated from each other.

In some embodiments, the touch sub-modules 301, 302 are stacked orthogonally, such that orthogonal projections of the third touch electrodes E3_1, E3_2, . . . , E3_A and the fourth touch electrodes E4_1, E4_2, . . . , E4_B onto a predetermined plane (e.g., the third surface SF3 of the substrate 320) is perpendicular to orthogonal projections of the first touch electrodes E1_1, E1_2, . . . , E1_N and the second touch electrodes E2_1, E2_2, . . . , E2_M onto the predetermined plane.

By utilizing the third and fourth touch electrodes E3_1, E3_2, . . . , E3_A, E4_1, E4_2, . . . , E4_B and the first and second fourth touch electrodes E1_1, E1_2, . . . , E1_N, E2_1, E2_2, . . . , E2_M orthogonal to each other, the touch module 300 can detect a touch point in two perpendicular directions (e.g., a horizontal direction and a perpendicular direction).

It should be noted that although the touch sub-module 301 is disposed on the touch sub-module 302 in the embodiment shown in FIG. 3, in some other embodiments, the touch sub-module 302 may be disposed on the touch sub-module 301, and the present disclosure is not limited to the embodiment in FIG. 3.

In the following paragraphs, a manufacturing method of a touch module is described with reference to FIGS. 4, and 5A-5C. The manufacturing method can be used to manufacture a touch module having a structure that is the same as or similar to the touch module 100 shown in FIG. 1A. To simplify the description below, in the following paragraphs, the touch module 100 shown in FIG. 1A will be used as an example to describe the manufacturing method according to an embodiment of the present disclosure. However, the present disclosure is not limited to application to the embodiment shown in FIG. 1A.

In addition, it should be noted that, in the steps of the following manufacturing method, no particular sequence is required unless otherwise specified. Moreover, the following steps also may be performed simultaneously or the execution times thereof may at least partially overlap.

Moreover, to simplify the description below, in the following paragraphs, the first touch electrodes E1_1, E1_2 and the second touch electrode E2_1 will be taken as an example. However, in fact, any one of the first touch electrodes E1_1, E1_2, . . . , E1_N and the second touch electrodes E2_1, E2_2, . . . , E2_M can be formed by using the method below.

Figure 4:
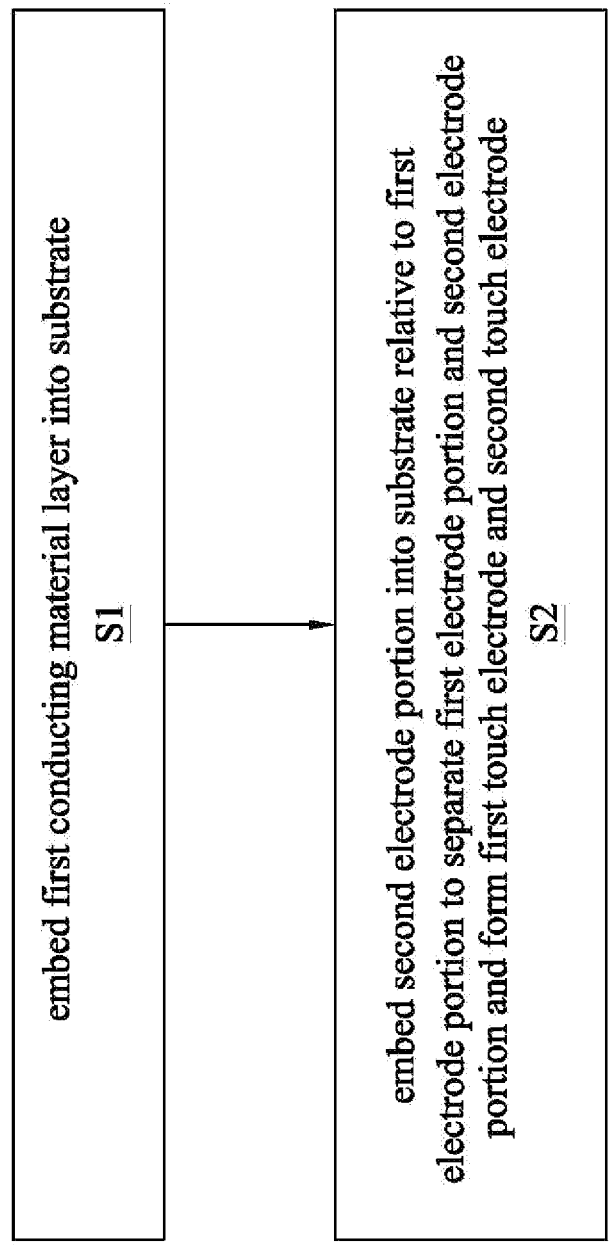
FIG. 4 is a flowchart of a manufacturing method of a touch module according to one or more embodiments of the present disclosure.
Figure 5A:
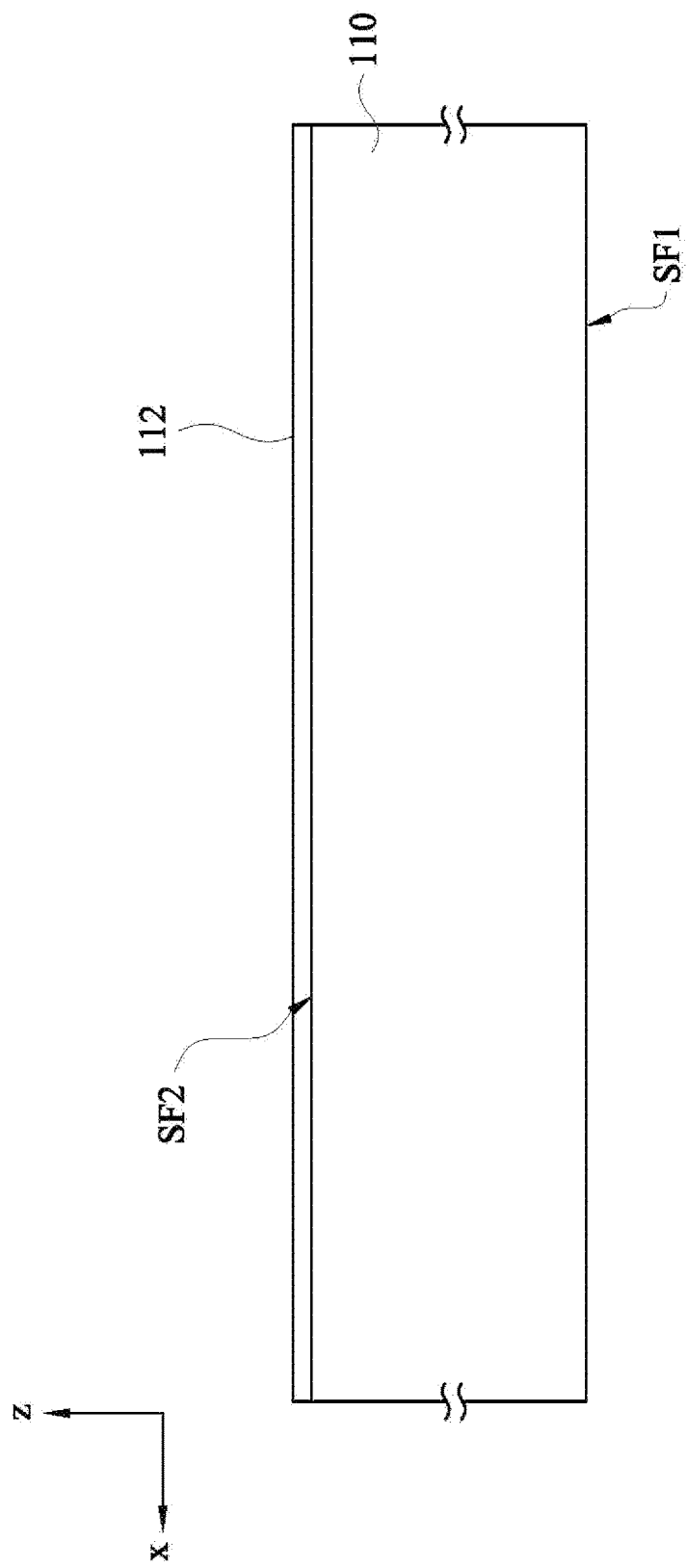
Figure 5B:
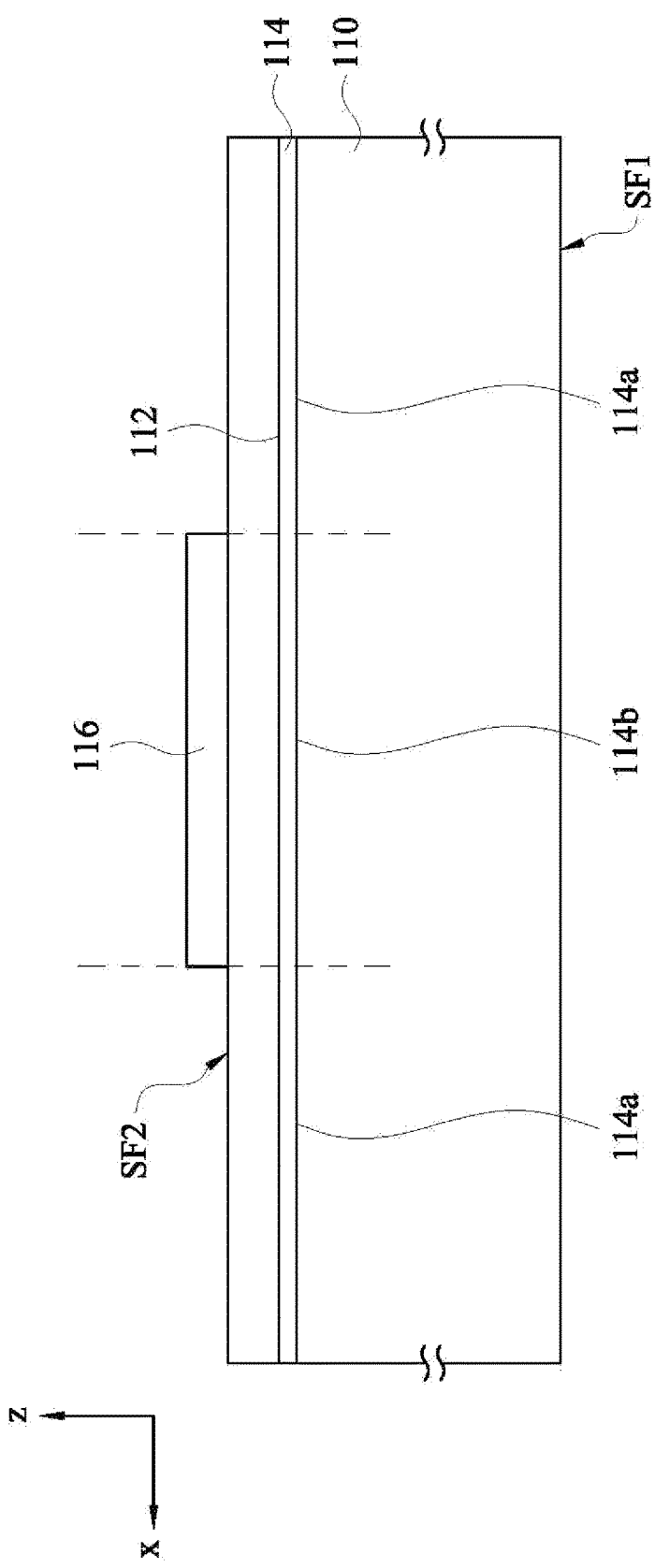

Reference is now made to FIGS. 4 and 5A-5B. In a first step, an embedded ink 112 including a first conducting additive is provided on the second surface SF2 of the substrate 110, such that the first conducting additive can be embedded into the substrate 110 to from a first conducting material layer 114 (step S1), as shown in FIG. 5B. The first conducting material layer 114 includes a first electrode portion 114a and a second electrode portion 114b respectively used to form the first touch electrodes (e.g., the first touch electrodes E1_1, E1_2) and the second touch electrodes (e.g., the second touch electrode E2_1) in subsequent steps.

In one or more embodiments, the substrate 110 can be made by using polymethyl methacrylate (PMMA), polycarbonate (PC), polyethylene terephthalate (PET), cyclo olefin polymer (COP), or another suitable high polymer material, but is not limited in this regard. In one or more embodiments, the embedding ink 112 having the first conducting additive can be made by dissolving the first conducting additive into a specified liquid, in which a solubility parameter of such a specified liquid is close to a solubility parameter of the material of the substrate 110, such that the first conducting additive dissolved in the specified liquid can seep into the substrate 110 and be embedded into the substrate 110. In one or more embodiments, the first conducting additive may be made by using carbon nanotubes, nano metal traces, a conductive adhesive, conductive polymer, grapheme, nano metal, or another suitable conductive material, but is not limited in this regard.

More specifically, by providing the embedding ink 112 having the first conducting additive on the second surface SF2 of the substrate 110 made by a high polymer material, a portion of the substrate 110 adjacent to the second surface SF2 is swelled, such that the first conducting additive dissolved in the specified liquid can seep into the substrate 110 and be embedded into the substrate 110.

In one or more embodiments, in the first step described above, the embedding ink 112 can be sprayed or printed on the second surface SF2 of the substrate 110. However, the present disclosure is not limited in this regard.

Reference is now made to FIG. 4 and FIG. 5B-5C. In a second step, an embedding ink 116 without a conducting additive is provided on the second surface SF2 of the substrate 110 corresponding in location to the second electrode portion 114b of the first conducting material layer 114, so as to embed the second electrode portion 114b further into the substrate 110 relative to the first electrode portion 114a to separate the first electrode portion 114a and the second electrode portion 114b and form the first touch electrodes E1_1, E1_2 and the second touch electrode E2_1 (step S2).

Through such operations, substantially no gap or overlap is present among the orthogonal projections of the first touch electrodes E1_1, E1_2 and the second touch electrode E2_1 onto the first surface SF1 of the substrate 110.

It should be noted that, in the description herein and throughout the claims that follow, the term "substantially" is used in association with values that may vary slightly and in association with slight deviations that may result from manufacturing processes, in which such minor errors do not change the properties relevant to the values and the characteristics of the elements. For example, during embedding the second electrode portion 114b further into the substrate 110 relative to the first electrode portion 114a, deviations may be caused by extrusions in the embedding process, such that there may exist minor gaps or overlapping among the orthogonal projections of the first touch electrodes E1_1, E1_2 and the second touch electrode E2 onto the substrate 110. However, such minor errors (e.g., the gaps and overlaps) caused by manufacturing processes are within the contemplated scope of the present disclosure.

In one or more embodiments, the solubility parameter of the embedding ink 116 is close to the solubility parameter of the material of the substrate 110

In one or more embodiments, in the second step described above, the embedding ink 116 can also be sprayed or printed on the second surface SF2 of the substrate 110. However, the present disclosure is not limited in this regard.

In other words, the manufacturing method described above includes embedding the first conducting material layer 114 into the substrate 110, and embedding the second electrode portion 114b further into the substrate 110 relative to the first electrode portion 114a to form the first touch electrodes E1_1, E1_2 and the second touch electrode E2_1 separated from each other.

It should be noted that, in the embodiments described above, the embedding can be achieved by providing the embedding ink 112, 116 on the second surface SF2 of the substrate 110. However, the present disclosure is not limited to such a procedure, and any method that can achieve the embedding is within the contemplate scope of the present disclosure.

Additionally, the manufacturing method described above can be used to form the touch sub-modules 301, 302 illustrated in FIG. 3. For example, after a first conductive material layer is embedded into the substrate 310, a second electrode portion of the first conductive material layer is embedded further into the substrate 310 relative to a first electrode portion of the first conductive material layer, such that the first touch electrodes E1_1, E1_2 and the second touch electrode E2_1 separated from each other can be formed. Similarly, after a second conductive material layer is embedded into the substrate 320, a third electrode portion of the second conductive material layer is embedded further into the substrate 320 relative to a fourth electrode portion of the second conductive material layer, such that the third touch electrodes E3_1, E3_2 and the fourth touch electrode E4_1 separated from each other can be formed.

It should be noted that details of the steps described above can be ascertained by referring to the embodiment illustrated in FIGS. 4A-4C, and a description in this regard will not be repeated herein. In addition, in some embodiments, the second conductive material layer, the third electrode portion, and the fourth electrode portion are similar to the first conductive material layer 114, the first electrode portion 114a, and the second electrode portion 114b, and therefore details of these elements will not be repeated herein.

Through the operations described above, the touch sub-modules 301, 302 illustrated in FIG. 3 can be formed. After the touch sub-modules 301, 302 are formed, the substrate 310 and the substrate 320 can be stacked orthogonally, such that orthogonal projections of the third touch electrodes E3_1, E3_2, . . . , E3_A and the fourth touch electrodes E4_1, E4_2, . . . , E4_B onto a predetermined plane (e.g., the third surface SF3 of the substrate 320) is perpendicular to orthogonal projections of the first touch electrodes E1_1, E1_2, . . . , E1_N and the second touch electrodes E2_1, E2_2, . . . , E2_M onto the predetermined plane. As a result, the touch module 300 in FIG. 3 can be formed. In some embodiments, a material layer (not shown) is disposed between the touch sub-modules 301, 302 to attach touch sub-modules 301, 302 together. The material layer may be realized by using signal material or multi-material. However, the present disclosure is not limited in this regard.

Moreover, it should be noted that, in the embodiments described above, the touch module 100 and the touch sub-modules 301, 302 are taken as examples. However, in some embodiments, similar processes can be used to manufacture the touch module 200.

In the paragraphs below, a manufacturing method of a touch module is described with reference to FIG. 6A-6C. The manufacturing method can be used to manufacture a touch module having a structure that is the same as or similar to the touch module 200 shown in FIG. 2A. To simplify the description below, in the following paragraphs, the touch module 200 shown in FIG. 2A will be used as an example to describe the manufacturing method according to an embodiment of the present disclosure. However, the present disclosure is not limited to application to the embodiment shown in FIG. 2A.

In addition, it should be noted that, in the steps of the following manufacturing method, no particular sequence is required unless otherwise specified. Moreover, the following steps also may be performed simultaneously or the execution times thereof may at least partially overlap.

Moreover, to simplify the description below, in the following paragraphs, the first touch electrodes E1_1, E1_2, the second touch electrode E2_1, the third touch electrodes E3_1, E3_2 and the fourth touch electrode E4_1 will be taken as examples. However, in fact, any one of the first touch electrodes E1_1, E1_2, the second touch electrode E2_1, the third touch electrodes E3_1, E3_2 and the fourth touch electrode E4_1 can be formed by using the method below.

The steps of forming the first touch electrodes E1_1, E1_2 and the second touch electrode E2_1 can be ascertained by referring to the embodiment in FIGS. 5A-5C, and a description in this regard will not be repeated herein.

Figure 6A:
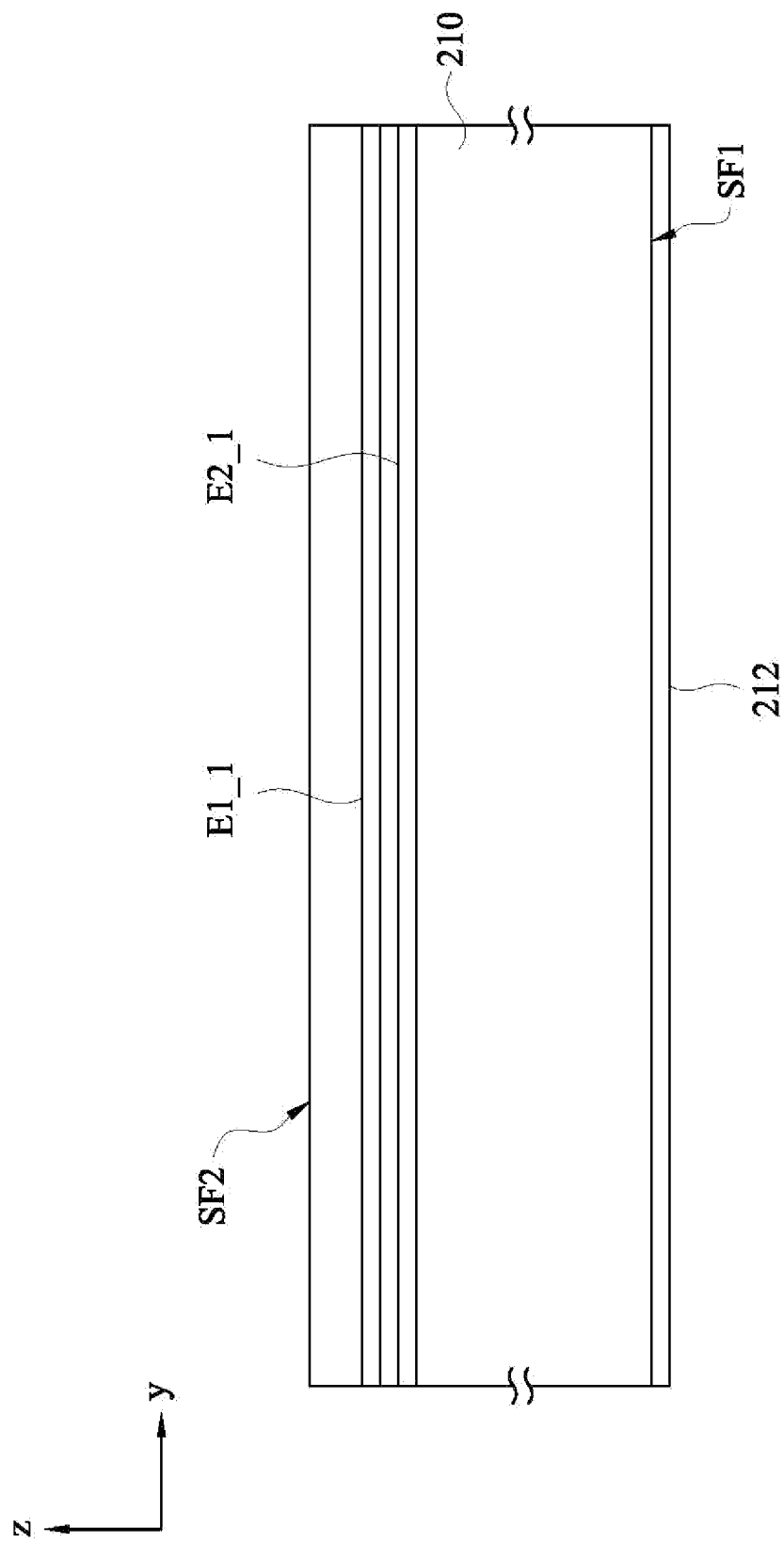

Particular reference is made to FIGS. 6A-6B. In a third step, an embedded ink 212 including a second conducting additive is provided on the first surface SF1 of the substrate 210, such that the second conducting additive can be embedded into the substrate 210 to from a second conducting material layer 214. The second conducting material layer 214 includes a third electrode portion 214a and a fourth electrode portion 214b respectively used to form the third touch electrodes (e.g., the third touch electrodes E3_1, E3_2) and the fourth touch electrodes (e.g., the fourth touch electrode E4_1) in subsequent steps.

In some embodiments, details of the substrate 210 and the embedded ink 212 including the second conducting additive can be ascertained by referring to the embodiment described above, and a description in this regard will not be repeated herein. In addition, in some embodiments, the material of the embedded ink 212 including the second conducting additive may be the same as or different from the material of the embedded ink 112 including the first conducting additive.

Moreover, details of providing the embedded ink 212 including the second conducting additive on the first surface SF1 of the substrate 210 can be ascertained by referring to the embodiment described above, and a description in this regard will not be repeated herein.

Figure 6C:
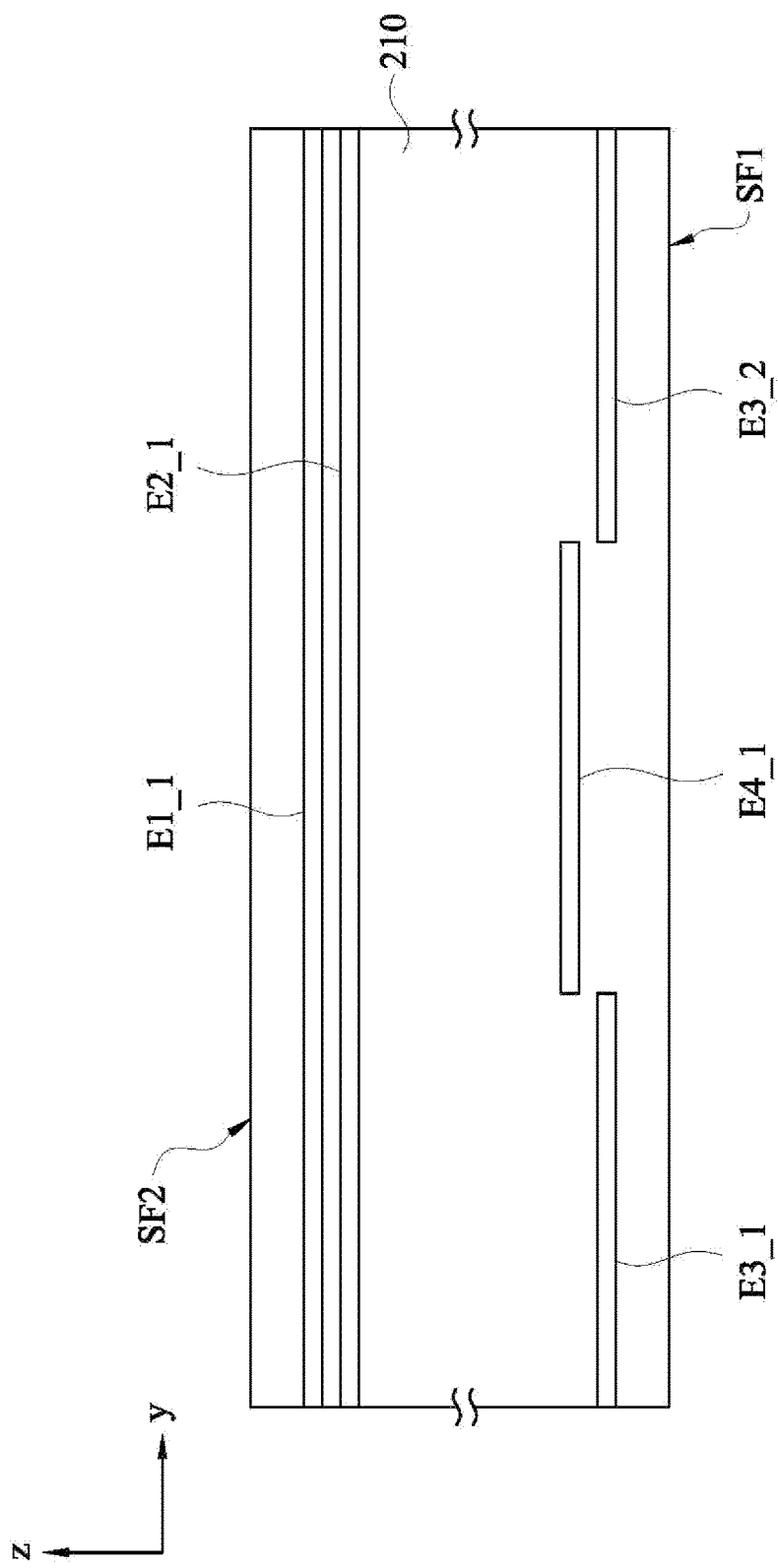

Particular reference is made to FIGS. 6B-6C. In a fourth step, an embedding ink 216 without conducting additive is provided on the first surface SF1 of the substrate 210 corresponding in location to the fourth electrode portion 214b of the second conducting material layer 214, so as to embed the fourth electrode portion 214b further into the substrate 210 relative to the third electrode portion 214a to separate the third electrode portion 214a and the fourth electrode portion 214b and form the third touch electrodes E3_1, E3_2 and the fourth touch electrode E4_1.

Through such operations, substantially no gap or overlap is present among the orthogonal projections of the third touch electrodes E3_1, E3_2 and the fourth touch electrode E4_1 onto the first surface SF1 of the substrate 210.

In some embodiments, details of the embedding ink 216 without conducting additive can be ascertained by referring to the embodiment described above, and a description in this regard will not be repeated herein. In addition, the material of the embedding ink 216 without conducting additive may be the same as or different from the material of the embedding ink 116 without conducting additive.

Moreover, details of providing the embedding ink 216 without conducting additive on the first surface SF1 of the substrate 210 can be ascertained by referring to the embodiment described above, and a description in this regard will not be repeated herein.

In other words, the manufacturing method described above includes forming the first touch electrodes E1_1, E1_2 and the second touch electrode E2_1 separated from each other, embedding the second conducting material layer 214 into the substrate 210, and embedding the fourth electrode portion 214b further into the substrate 210 relative to the third electrode portion 214a to form the third touch electrodes E3_1, E3_2 and the fourth touch electrode E4_1 separated from each other. Through such operations, patterning the touch electrodes E3_1, E3_2, E4_1 by an etching process can be avoided, such that the problem of adversely affecting the optical consistency in the appearance of the touch module 200 caused by uneven refractive indexes of the touch module is not encountered.

It should be noted that, in the embodiments described above, the embedding can be achieved by providing the embedding ink 212, 216 on the first surface SF1 of the substrate 210. However, the present disclosure is not limited to such a procedure, and any method that can achieve the embedding is within the contemplate scope of the present disclosure. In addition, in some embodiments, since the touch electrodes E1_1-E1_N, E2_1-E2_M, E3_1-E3_A, E4_1-E4_B are completely embedded in the substrate 210, the touch module 200 is intact, and the subsequent manufacturing and assembly processes of the touch module 200 are facilitated.

Although the present disclosure has been described in considerable detail with reference to certain embodiments thereof, other embodiments are possible. Therefore, the scope of the appended claims should not be limited to the description of the embodiments contained herein.

What is claimed is:
1. A manufacturing method of a touch module, the manufacturing method comprising:
providing an embedding ink with a first conducting additive on a first surface of a first substrate, wherein the first substrate is swelled so that the first conducting additive seeps into the first substrate to form a first conducting material layer embedded into a first substrate, wherein:
the first conducting material layer comprises at least one first electrode portion and at least one second electrode portion, and
the first electrode portion and the second electrode portion are both embedded a first distance into the first substrate as measured from the first surface of the first substrate; and
providing an embedding ink without conducting additive on the first surface of the first substrate corresponding in location to the second electrode portion of the first conducting material layer, wherein the first substrate is swelled so that the second electrode portion further seeps into the first substrate relative to the first electrode portion so as to separate the first electrode portion and the second electrode portion and separately form a first touch electrode embedded the first distance into the first substrate as measured from the first surface of the first substrate and a second touch electrode embedded a second distance into the first substrate as measured from the first surface of the first substrate, wherein the first touch electrode and the second touch electrode are insulated from each other.

2. The manufacturing method as claimed in claim 1, wherein the providing an embedding ink with a first conducting additive on a first surface of a first substrate comprises:
spraying or printing the embedding ink with the first conducting additive on the first surface of the first substrate.

3. The manufacturing method as claimed in claim 1, wherein
a difference between the first distance and the second distance is substantially greater than 50 nanometers.

4. The manufacturing method as claimed in claim 1 further comprising:
providing an embedding ink with a second conducting additive on a second surface of the first substrate, wherein the first substrate is swelled so that the second conducting additive seeps into the first substrate to form a second conducting material layer embedded into a first substrate, wherein the second conducting material layer comprises at least one third electrode portion and at least one fourth electrode portion, and the third electrode portion and the fourth electrode portion are both embedded a third distance into the first substrate as measured from the second surface of the first substrate; and
providing the embedding ink without conducting additive on the second surface of the first substrate corresponding in location to the fourth electrode portion of the second conducting material layer, wherein the first substrate is swelled so that the fourth electrode portion further seeps into the first substrate relative to the third electrode portion so as to separate the third electrode portion and the fourth electrode portion and separately form a third touch electrode embedded the third distance into the first substrate as measured from the second surface of the first substrate and a fourth touch electrode embedded a fourth distance into the first substrate as measured from the second surface of the first substrate, wherein the first touch electrode, the second touch electrode, the third touch electrode, and the fourth touch electrode are insulated from each other.

5. The manufacturing method as claimed in claim 4, wherein the providing an embedding ink with a second conducting additive on a second surface of the first substrate comprises:
spraying or printing the embedding ink with the second conducting additive on the second surface of the first substrate.

6. The manufacturing method as claimed in claim 4, wherein a difference between the third distance and the fourth distance is substantially greater than 50 nanometers.

7. The manufacturing method as claimed in claim 4, wherein a difference between heights of any two of the first touch electrode, the second touch electrode, the third touch electrode, and the fourth touch electrode relative to the first surface of the first substrate is substantially greater than 50 nanometers.

8. The manufacturing method as claimed in claim 4, wherein:
one of the first touch electrode and the second touch electrode is floated, and
one of the third touch electrode and the fourth touch electrode is floated.

9. The manufacturing method as claimed in claim 1, further comprising:
providing an embedding ink with a second conducting additive on a first surface of a second substrate, wherein the second substrate is swelled so that the second conducting additive seeps into the second substrate to form a second conducting material layer embedded into a second substrate, wherein the second conducting material layer comprises at least one third electrode portion and at least one fourth electrode portion, and the third electrode portion and the fourth electrode portion are both embedded a third distance into the second substrate as measured from the first surface of the second substrate; and
providing the embedding ink without conducting additive on the first surface of the second substrate corresponding in location to the fourth electrode portion of the second conducting material layer, wherein the second substrate is swelled so that the fourth electrode portion further seeps into the second substrate relative to the third electrode portion so as to separate the third electrode portion and the fourth electrode portion and separately form a third touch electrode embedded the third distance into the second substrate as measured from the first surface of the second substrate and a fourth touch electrode embedded a fourth distance into the second substrate as measured from the first surface of the second substrate, wherein the third touch electrode and the fourth touch electrode are insulated from each other.

10. The manufacturing method as claimed in claim 9, further comprising:
stacking the first substrate and the second substrate orthogonally such that orthogonal projections of the first touch electrode and the second touch electrode onto a predetermined plane is perpendicular to orthogonal projections of the third touch electrode and the fourth touch electrode onto the predetermined plane.

11. The manufacturing method as claimed in claim 10, further comprising:
attaching the first substrate and the second substrate by a layer.

12. The manufacturing method as claimed in claim 9, wherein the providing an embedding ink with a second conducting additive on a first surface of a second substrate comprises:
spraying or printing the embedding ink with the second conducting additive on the first surface of the second substrate.

13. The manufacturing method as claimed in claim 9, wherein a difference between the third distance and the fourth distance is substantially greater than 50 nanometers.

14. The manufacturing method as claimed in claim 9, wherein orthogonal projections of the first touch electrode and the second touch electrode onto the first surface of the first substrate are substantially not overlapped with each other, and orthogonal projections of the third touch electrode and the fourth touch electrode onto the first surface of the second substrate are substantially not overlapped with each other.

15. The manufacturing method as claimed in claim 1, wherein orthogonal projections of the first touch electrode and the second touch electrode onto the first surface of the first substrate are substantially not overlapped with each other.

16. The manufacturing method as claimed in claim 1, wherein the first touch electrode and the second touch electrode are formed as strips.

17. The manufacturing method as claimed in claim 1, wherein the first touch electrode and the second touch electrode are parallel to each other.

18. The manufacturing method as claimed in claim 1, wherein orthogonal projections of the first touch electrode and the second touch electrode onto the first surface of the first substrate are substantially not overlapped with each other.

19. The manufacturing method as claimed in claim 1, wherein: one of the first touch electrode and the second touch electrode is floated.

* * * * *